United States Patent [19]

La Barge et al.

[11] Patent Number: 4,611,381
[45] Date of Patent: Sep. 16, 1986

[54] METHOD OF JOINING TWO OR MORE PIECES OF MALLEABLE MATERIAL

[75] Inventors: Robert L. La Barge, Ben Avon Borough; Ronald J. Ewing, Allegheny Township, Westmoreland County, both of Pa.

[73] Assignee: Aluminum Company of America, Pittsburgh, Pa.

[21] Appl. No.: 684,694

[22] Filed: Dec. 21, 1984

[51] Int. Cl.⁴ .................................... B23P 11/00
[52] U.S. Cl. ........................ 29/432; 29/459; 29/509; 29/21.1; 29/243.5; 29/283.5; 29/243.54
[58] Field of Search ............. 29/432, 432.1, 432.2, 29/459, 509, 512, 521, 523, 21.1, 243.52, 243.53, 243.54, 283.5, DIG. 7, 243.5, 798

[56] References Cited

U.S. PATENT DOCUMENTS

| | | | |
|---|---|---|---|
| 2,186,381 | 1/1940 | Howe | 29/432 UX |
| 2,215,918 | 9/1940 | Fay | 29/512 UX |
| 3,082,850 | 3/1963 | Weening | 29/521 X |
| 3,093,885 | 6/1963 | Morrison et al. | 29/DIG. 7 UX |
| 3,824,675 | 7/1974 | Ballantyne | 29/512 X |
| 4,306,511 | 12/1981 | Ashby et al. | 29/432 X |

FOREIGN PATENT DOCUMENTS 477538  1/1938  United Kingdom ................. 29/459

*Primary Examiner*—Charlie T. Moon
*Attorney, Agent, or Firm*—Elroy Strickland

[57] ABSTRACT

A method of joining together two or more pieces of malleable material. The method includes the steps of placing thoroughly cleaned surfaces of the pieces in intimate contact with each other and forming a flanged hole through all of them at the same time. This is accomplished by directing a draw punch against the pieces and directing the same into the opening of a die while the material is compressively stressed to a value substantially equal to the yield strength of the material. The punch provides the completed flanges with an hourglass shape, such shape locking the inner and outer flanges together against axial displacement.

15 Claims, 4 Drawing Figures

METHOD OF JOINING TWO OR MORE PIECES OF MALLEABLE MATERIAL

BACKGROUND OF THE INVENTION

The present invention is directed to a method and apparatus for securing together two or more pieces of material in a manner that does not involve welding, adhesives, or the use of a separate fastener yet does involve the creation of a mechanical joint that has properties comparable to those produced by welding and separate fasteners.

Spot welds in aluminum sheet, such as Aluminum Alloys 6009 and 6010, have only approximately 60% of the static tensile strength and approximately 40% of the fatigue tensile strength of spot welds in steel sheet employed in automobile bodies. (Static strength is the highest constant load a joint will carry. Fatigue strength is the cyclic load a joint will carry over a given number of cycles.) This presents a serious deterrent to the use of aluminum body sheet in automobiles, as the method's alternative to spot welding of aluminum sheet presents substantial performance and cost problems in comparison to the spot welding of steel. Clinched joints, for example, which are alternative mechanical, non-separate fastener joints, have adequate static tensile strength but inadequate stiffness and fatigue tensile strength. Properly made adhesive joints have satisfactory properties, but the cost and the speed of production are problems since adhesives require cleaning of the sheet, spreading of the adhesive, jigging, clamping sheet portions together and then curing of the adhesive. The cost of the adhesive material is also a factor in the economics of using adhesives. Rivets give satisfactory performance but again the cost and speed of production are problems as the rivets require jigging, drilling or punching of holes in the sheets, placing the rivet in the sheets and heading the rivet. Again, the cost of the rivet is an economic factor. By comparison, the spot welding of steel requires only jigging and the welding process which involves a single-stroke operation. The spot welding of steel does not require any preparation for joining nor the placement of an expendable joining element, such as a rivet, nor the step of fixing the joining element in place. This makes the spot welding of steel substantially faster, more convenient and lower in cost than the available methods for joining aluminum.

BRIEF SUMMARY OF THE INVENTION

It is therefore an object of the present invention to provide a mechanical joint between pieces of malleable material suitable for structural joining in automobiles and other applications by forming hollow, integral, open-ended collars in the material in a single stroke punching operation.

Another objective of the invention is to form the above joint in a period of time comparable to the time required to effect a spot weld in steel workpieces by employing methods and apparatus that provide savings of 20-30% over that of equipment for the spot welding of steel and which requires an energy consumption that is about 1% of that required to spot weld aluminum.

It is yet another objective of the invention to effect a joint using hollow integral collars that are locked together against axial displacement without heading or flaring the collars.

Another objective of the invention is to provide tooling to effect the subject joint in which the integral collars have an hourglass configuration in cross section, the hourglass configuration locking the inner and outer flanges together against axial displacement.

A further objective of the invention is to provide residual compressive stress between faying surfaces of the collars to produce tight, stiff joints.

These and other objectives of the invention can be provided by a portable, fluid powered gun having, inter alia, punch and die assemblies for forming the integral collars. Since the source of power is fluid (an inert gas and/or hydraulics), many such guns can use a single fluid source, as opposed to multiple electrical power supplies that are required for a plurality of spot welders. Handling of the gun of the invention, however, is similar to handling a spot welding gun, as both exert a clamping action on the workpieces to be joined. The clamping forces for the apparatus of the subject invention though are substantially greater than those employed for spot welding such that the gun employed in the subject process may be slightly heavier than that employed for spot welding. Spot welding requires only a force sufficient to create good electrical contact between two sheets and between the sheets and the spot welder tips, while the subject invention requires sufficient forces to form the joint.

THE DRAWINGS

The objectives and the advantages of the invention will be best understood from consideration of the following detailed description and the accompanying drawings in which.

PREFERRED EMBODIMENT

Figure 1:
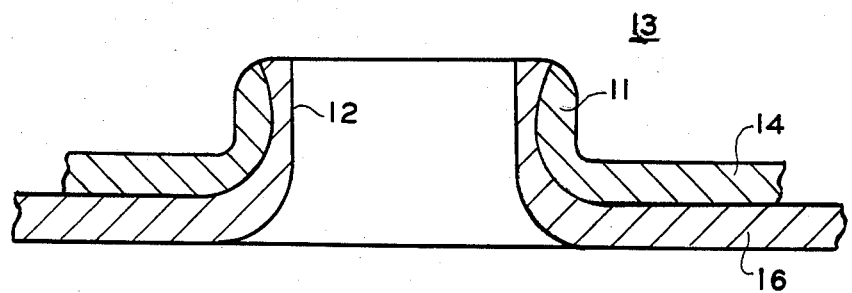
FIG. 1 shows in cross section the hollow integral rivet of the invention.
Figure 2:
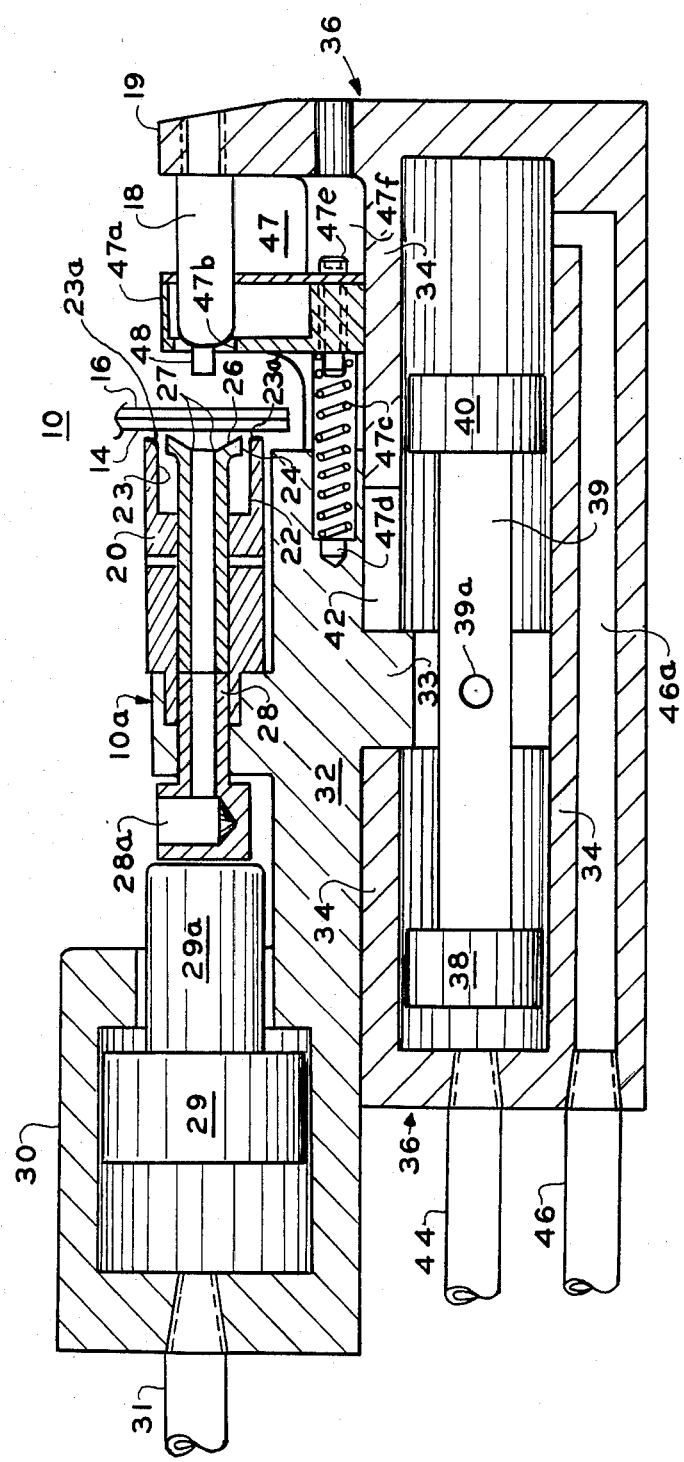
FIG. 2 shows a punch and die arrangement for effecting the rivet of FIG. 1.

Referring now to FIG. 2 of the drawings, punch and die assemblies 10 are shown for forming integral, axially locking collars or flanges 11 and 12 (FIG. 1) from two (or more) pieces of malleable material 14 and 16 disposed together, as shown in FIG. 2. The collars of FIG. 1 form a headless rivet, generally designated by numeral 13, that provides a high strength mechanical joint between 14 and 16.

The assemblies of 10 are preferably housed in a portable, hand-held device 10a that allows a workman to quickly and easily locate the device on opposed sides of 14 and 16 and rapidly join 14 and 16 together by forming the integral rivet of FIG. 1. The invention, however, is not limited to a joining process employing only hand-held devices.

As shown further in FIG. 2, the assemblies of 10 include a draw punch 18 and a die arrangement 20, the punch being axially fixed in a frame member 19 of device 10a while the die arrangement is axially movable in relation to the punch. Obviously, the punch can be movable and die fixed, or both can be made axially movable.

Assembly 20 comprises an outer, continuous wall, tubular structure 22 providing an integral die opening 23 having an internal diameter larger than the outer diameter of draw punch 18 by 1.1 to 1.6 times the combined thickness of the pieces to be joined.

Located in the axial center of die 20 is a pressure plate 24, the surface 26 thereof facing draw punch 18 being flat or concave for purposes explained below. The center of plate 24 is open to provide the cutting edge 27 of a perforating die (in cooperation with a perforating punch described hereinafter).

The pressure plate 24 is mounted at one end of stem structure 28 that is mechanically associated with a piston 29 located in a cylinder 30. Between a forward extension 29a of the piston and the rearward end of stem 28 is a cup-shaped structure 28a (FIG. 2). This structure is an integral part of stem 28 such that the hollow bore of the stem opens into the hollow of the cup. Such a structure provides an outlet for the discharge of metal blanks that are produced in forming the rivet of the invention. Cylinder 30 can be supplied and regulated with an inert gas, such as nitrogen, at 31 under a pressure value sufficient to have piston 29 hold the pressure plate against the forming force of the draw punch and die assembly 18 and 20 in a manner explained in detail hereinafter. In FIG. 2, cylinder 30 is pressurized such that the piston is in a position disposed against cup 28a.

Referring again to FIG. 2, a slide mechanism 32 is shown for translating the die assembly 20 toward and away from draw punch 18. More particularly, slide 32 is made to engage and support the die and pressure plate arrangement (20, 24 and 28) and cylinder 30, and is provided with an integral structure and saddle 33 (FIG. 4), located opposite the die and pressure plate, that extends through the wall 34 of a cylinder structure 36 housing two pistons 38 and 40. An elongated slot 42 is provided in wall 38 to accommodate axial translation of saddle 33, the length of the slot being that required for moving die 20 to draw punch 18 in the process of making integral rivet 13. The saddle structure (visible only in FIG. 4) straddles a rod 39 (visible only in FIG. 2) that connects the pistons together; a pin (not shown) extends through an opening 33a provided in the saddle and through an opening 39a provided in the rod. An appropriate fluid is directed to cylinder 36 via hoses 44 and 46 and a channel 46a provided in the housing of 36 for translating the pistons. In this manner, slide 32 is translated by the pistons, saddle and rod.

In forming the integral rivet of the invention, draw punch 18 requires lubrication. To this end and for the purpose of stripping the rivet from the punch after it is formed, a combination stripping and lubricating means 47 is provided as shown in FIG. 2. More particularly, 47 includes cup-shaped housing 47a located around the punch, and is provided with an opening 47b through which the forward end of the punch travels in forming the rivet. The inside of the cup of housing 47a is packed with a soft material (not shown) capable of absorbing and retaining a lubricant. The material is in contact with the forward surfaces of the punch such that the punch is always lubricated for and during the rivet-forming process, the lubrication also preventing the accumulation of metal material on the punch surface.

Stripping and lubricating means 47 is mechanically displaced from slide 32 via a coil spring 47c. This keeps the stripping and lubricating means out of the area between the end of a punch 48 and die 20 so that the workpieces 14 and 16 can be inserted for the joining process. 47c is shown disposed in a recess 47d provided in the slide and around a pin 47e extending through the body of 47 such that the spring is captured between 32 and 47. When the slide moves toward the punch, stripper 47 is moved toward frame member 19 and travels in ways 47f provided in the main structure of the device 10a.

Figure 4:
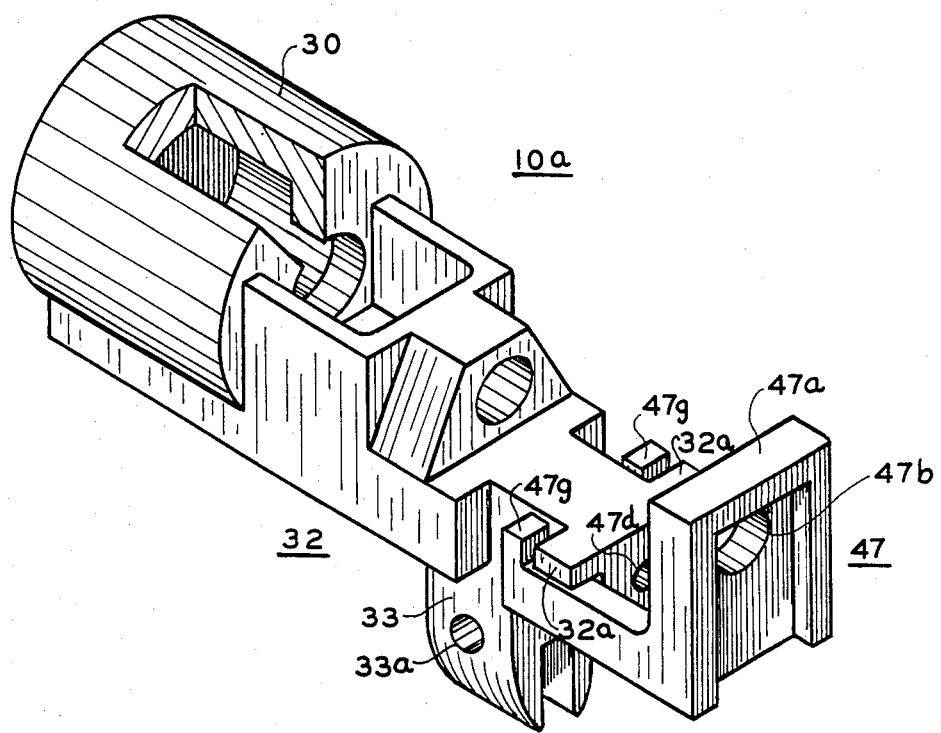
FIG. 4 is a perspective view of a slide mechanism of the arrangement depicted in FIG. 2.

In addition, stripper-lubricator 47 is provided with integral projections 47g, as depicted in FIG. 4 of the drawings. The projections are located to engage integral bosses 32a, provided on slide 32 (FIG. 4), when the slide moves to the left after the joint and rivet of the invention are formed.

Figure 3:
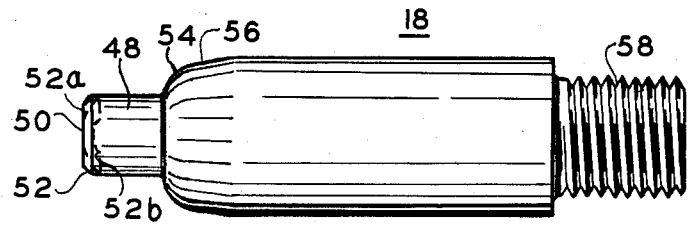
FIG. 3 is an enlarged side elevation view of the punch of FIG. 1.

Referring now to FIG. 3 of the drawings, draw punch 18 of FIG. 2 is enlarged to better show the profile of the punch. As depicted, the forward end of the draw punch is provided with a perforating punch 48. As shown in FIG. 2, 48 extends into opening 47b provided in stripper 47. The forward end of the perforating punch can be flat or have a non-cutting central portion 50. Portion 50 may be provided in a variety of ways, such as by the beveled edge 52 shown in FIG. 3, or the two rounded configurations depicted in dash outline and labeled 52a and 52b in FIG. 3. The size (diameter) of perforating punch 48 is about one-third ($\frac{1}{3}$) to two-thirds ($\frac{2}{3}$) of the diameter of the main body of draw punch 18. The purpose of the central non-cutting portion of the perforating punch will be apparent in a later discussion of the operation of the system, as thus far described.

In tests of the punch and die assembly, as thus far described, an angle of 45° for the bevel of 52 was found to be satisfactory. The width of the bevel was about 15% of the diameter of 48, leaving a flat forward surface of 70% of the diameter of the perforating punch.

Still referring to FIG. 3, the face or forward portion of the main body of draw punch 18 is provided with radii of curvatures 54 that decrease as the radii approach tangency with the face of the punch, which is the portion of the punch adjacent perforating punch 48. The radii of curvature of draw punch 18, however, in approaching its outer diameter increases, as indicated by numeral 56. Hence, the optimum curvature of the forward end of the draw punch is not that of a simple radius of a perfect circle. A simple radius would produce an inferior joint. These radii of the forward end of the draw punch change with changes in the diameter of the main body of the punch, as well as with the thicknesses of the workpieces to be joined together.

The radius of curvature of the concave surface 26 (FIG. 2) of the pressure plate is five to ten times that of the forward radii of the draw punch.

The other end of draw punch 18 is shown provided with a threaded nipple 58 that is an integral structure of the main body 18 of the punch. Nipple 58 provides a means to mount the punch to and remove the same from supporting frame 19 (in FIG. 2).

The operation of the apparatus of FIGS. 2 and 3 is as follows. Two or more pieces or sheets of material to be joined together are placed in a space between the perforating punch and the draw die. The material of the pieces should be malleable, which includes most metals, though the invention is not limited thereto, as there are non-metallic materials that are malleable, such as certain plastics.

A high coefficient of friction between faying surfaces of the sheets being joined is required and is best achieved by thorough cleaning of the pieces before they are placed together. In the case of metal pieces, solvent vapor degreasing or washing of the pieces in a non-solvent cleaner have been found highly effective in obtaining satisfactorily clean surfaces. Such clean metal surfaces are necessary to provide a high coefficient of friction between the surfaces of the pieces, i.e., faying surfaces, for reasons explained hereinafter: clean, dry surfaces of most metals provide typically high coefficients of friction.

Additional methods of obtaining high coefficients of friction include the use of abrasive powders located between the contacting surfaces when the rivet of FIG. 1 is formed and/or chemical or mechanical treatment of the surfaces before the rivet is formed, but they are not as effective or economical for metals as thorough cleaning.

In FIG. 2 of the drawings, two pieces 14 and 16 of malleable metal are shown placed together and located between draw punch 18 and die arrangement 20 of assembly 10.

Through the operation of appropriate control circuitry and switches (that are not shown in the drawings), an appropriate fluid is directed to cylinder 36 through hose 44. Under pressure of the fluid, piston 38 in the cylinder moves boss 33 and slide 32 to direct the die assembly 20, including pressure plate 24, against metal piece 14, and moves the pieces 14 and 16 to and against the face 50 of perforating punch 48. The pressure plate is maintained firm against piece 14 by the pressure of a supply of inert gas directed to cylinder 30. Gas pressure is employed here, as opposed to a mechanical spring, because the pressure of a gas is more readily adjustable than that of a mechanical spring. An adjustable valve, for example, can be connected in a hose supplying the gas and thus be located remotely from the tool and assembly of the invention. This is important in a hand-held device, as the remotely located valve does not add to the weight of the device. In contrast thereto, adjustment of a mechanical spring requires a threaded member in the housing of the spring, which member adds to the weight of the device.

The configuration of punch face 50, the concavity of pressure plate 24 and the opening 27 in the pressure plate delay piercing of the pieces 14 and 16 as long as possible without producing longitudinal cracks in the completed joint when the pieces are moved against punch 48, and the materials of the pieces are moved into concave area 26 of pressure plate 24. Mating dimples (not shown) of material are formed in pieces 14 and 16, and the materials are under considerable tension when punch 48 breaks through the materials adjacent the cutting edge of opening 27. Such action takes maximum advantage of the dimpling action of the perforating punch to start the formation of collars 11 and 12 yet still provides a good blanking operation, i.e., it ensures reasonably clean, cut holes in pieces 14 and 16.

When punch 48 breaks through pieces 14 and 16, 48 enters into opening 27 in pressure plate 24 such that the rounded face of draw punch 18 forces the material of 14 and 16 into and against the concave surface 26 of the pressure plate. The piston 38 in cylinder 36 continues to move the pressure plate and pieces 14 and 16 toward and against the rounded face of draw punch 18. Spring 47c pushes stripper 47a forward as slide 32 moves forward, which action pushes the stripper further and further onto the draw punch until stripper 47a makes contact with the interior face of frame portion 19 in which the draw punch is mounted. During this time also, the pressure in cylinder 30 maintains the pressure plate in position in die 20 such that pieces 14 and 16 are compressed between the pressure plate and draw punch 18. The pressure in cylinder 30 is such that, with continued movement of slide 32 and die 20, the materials of 14 and 16 are compressively stressed to values approximately equal to the yield strengths of the materials. When the yield strength is reached or closely approached, the force of the slide that moves the die assembly against punch 18 overcomes the force provided by the pressure in cylinder 30 such that pressure plate 24 gives way and materials of 14 and 16 (which are now perforated by punch 48) move into opening 23 of the die. Punch 18, in moving the materials of 14 and 16 into die opening 23, forms the collars 11 and 12 (of FIG. 1) in the following manner.

First of all, the compressive stresses across the thickness of 14 and 16 allows the use of starting holes in 14 and 16 that are relatively small and have a coarser surface finish without the attendant result of splitting of the open ends of the collars 11 and 12. In this manner, punching can be used for producing the starting holes and more material is provided for the collars and the hourglass configuration. Without compressive stressing of 14 and 16, larger starting holes with smooth finishes such as produced by reaming are required, and hence less material for the integral collars is available. But even more important than the additional material for the collars is the fact that compressive stressing to the yield strength of the pieces allows the use of a perforating punch 48 on the forward end of punch 18 so that a single, continuous stroke of the die assembly is effective to produce the hourglass rivet of FIG. 1. Without compressive stressing, at least two steps would be required to form the integral rivet, i.e., drilling and reaming of the starting holes would be required, and such processes would have to be operations that are separate from drawing the collars. Further details of the processes of the invention are as follows.

Die opening 23 is essentially that of an open cylinder. The mouth of the open cylinder and die in cross section of wall 22 has a radius 23a that is as small as possible yet does not provide a cutting edge and thus does not produce a notch effect at the base of the outer collar 11. With such a die radius, the length of the hourglass interface (between the inner and outer collars) that is perpendicular to the planes of 14 and 16 is maximized.

Further, the curvatures (54 and 56) at the forward end of draw punch 18 are such that 18 does not draw the inner collar 12 into die opening 23 with a uniform linear thickness. In addition, punch 18 does not thin the metal in the inner collar ahead of the punch as much as the metal being formed into the radius at the base of the collar during the early stages of forming the collars. This thicker metal subsequently becomes the thicker wall portion at the outer end of the inner collar, as shown in FIG. 1; this results in the hourglass shape of the final rivet structure.

This differential thinning occurs because a proper configuration of the forward end of punch 18 increases the resistance of the starting hole to being enlarged to let the draw punch pass through. This promotes forming of the base portion of the collars during the early stages of the process by forming the collars around radius 23a of 22. The inner collar 12 thus thins the most where it forms against the outer collar 11 as both collars are formed around the small radius 23a of the die opening. The greater thinning occurs in the inner collar because the mean radius at the base of the outer collar at this location is smaller than the mean radius at the base of the inner collar, and punch 18 draws the inner material around the longer path created by its larger radius.

As the punch moves further into die opening 23, high tensile forces are exerted on the inner material of 12 because the clean surfaces of the pieces 14 and 16 and their high compressive stress against each other creates a high frictional force between the pieces such that slippage between the pieces is minimal as the collars are formed in the die opening. Hence, the inner material of 12 is drawn with the outer material of 11 as the punch draws both pieces into the die opening. As the two pieces move together into the die, the inner piece stretches linearly more than the outer piece because of its larger radius of curvature about the die structure. In this manner, the heights of the final collar as shown in FIG. 1, are substantially the same.

The non-uniform linear stretching of the material of the inner collar as described forms a thin section of the material about midway between the ends of the collar; as the instantaneous change in length of the inner and outer collars becomes the same because they are both being drawn into straight tubular sections, and as draw resistance decreases in progressing to the final configuration of the collars and rivet, the axial stretching decreases, and the starter hole enlarges to let the punch pass through with the resultant thicker wall locating itself near the open end of the rivet 13. Stripper 47 with its lubrication, has traveled an appropriate distance along punch 18 under the force of piston 38 and coil spring 47c (now compressed).

The hourglass is allowed to form in die opening 23 in the processes of the invention because there is little or no ironing of the walls of the collars, though the space between the die surface of 23 and the surface of punch 18 is less than the combined original thickness of pieces 14 and 16. As indicated earlier, the die opening in 20 is essentially cylindrical, such that, as punch 18, which curves away from the interior surface of the die, moves the material of 14 and 16 into the die opening, contact between the material of outer collar 11 and the interior surface of the die is limited to the base of the outer collar and to about 10% of the final height of the collar. For the remainder of the extent of the collar, the material thereof is drawn essentially in air. In this manner, ironing of the walls of the collars in the die is avoided.

Ironing is to be avoided because it reduces the amount of the hourglass shape effected, and produces compressive stresses in the final structures of the collars, both of which reduce the strength of the final joint 13. Compressive stresses, for example, nullify an existing tensile springback (a shrinking in diameter) of the outer collar circumferentially on the inner collar. When joining sheets of metal, for example, of identical thickness, yield strength and modulus of elasticity, any orientation of the sheets relative to the punch and die produces the same high strength hourglass joint, with the outer collar exhibiting a circumferentially elastic springback or shrinkage phenomenon that grips the inner collar when punch 18 is withdrawn. The reason for this lies in the fact that the outer collar has a larger mean diameter than the inner collar, and the shrinkage phenomenon varies per unit of material length. Hence, the outer collar shrinks more than the inner collar and an interface pressure exists between the collars of completed rivet 13. This interface pressure insures the maintenance of a microscopic, mechanical granular engagement between the faying surfaces of 11 and 12 which is produced by stretching and extruding them while pressing them against each other with a high level of stress created first by the force of the pressure plate and then by the force attendant with expanding the outer collar by expanding the inner collar within the outer collar. When joining pieces that are identical except for thickness, however, the strongest joint is made if the thicker piece is in the inner collar, as the inner collar always experiences more thinning than the outer collar.

When joining items having unequal yield strengths and/or moduli of elasticity, the item with the least elastic springback should form the inner collar, again, to the effect that larger springback of the outer collar moves into tight engagement with the inner collar when the punch is withdrawn from the collars.

Elastic springback varies directly with the yield strength of the material involved in making the integral rivet of the present invention, and inversely with the modulus of elasticity of the material. Because of this, the piece of material having the lowest ratio of yield strength to modulus of elasticity should form the inner collar regardless of the relative thicknesses of the pieces. Before punch 18 is withdrawn from the collars, all materials in the collars are stressed to their yield strengths. Withdrawal of the punch allows the collars to shrink in diameter elastically in proportion to their yield strength and diameter and inversely as their modulus of elasticity If the material having the lowest ratio of yield strength to modulus of elasticity is located on the outside of the rivet, shrinkage of the inner collar will be greater than that of the outer collar, which will form a looser, weaker joint. Locating the material having the lowest ratio of yield strength to modulus of elasticity on the inside of the rivet insures that the shrinkage of the outer collar will always be greater and therefore insure a tight joint.

After rivet 13 is formed in die 20 and on draw punch 18, fluid is directed, via hose 46 and channel 46a, to the end of cylinder 36 containing piston 40. The pressure of the fluid is directed against 40 in a manner that drives 40 to the left, in FIG. 2 of the drawings, thereby translating boss 33 and slide 32 to the left. This moves die 20 away from punch 18 and moves stripper 47 to the left (in FIG. 2) to free pieces 14 and 16, which are now riveted together by 13, from the draw punch. As slide 32 moves to the left (in FIG. 2), its bosses 32a (FIG. 4) engage bosses 47g of the stripper (FIG. 4) to pull the stripper to the left along the punch. In this manner, rivet 13 is easily removed from the punch, and the lubricant in the cup of 47 again lubricates the surfaces of the punch as 47 moves to the left.

While the invention has been described in terms of preferred embodiments, the claims appended hereto are intended to encompass all embodiments which fall within the spirit of the invention.

What is claimed is:

1. A method of joining together two or more pieces of malleable material comprising placing faying surfaces of the pieces in intimate contact with each other and forming headless integral inner and outer tubular flanges having open ends from all of the pieces at the same time by continuously drawing material of the pieces located between a pressure plate and a convex face of a draw punch to form inner and outer tubular flanges having open ends and contacting surfaces flared outwardly toward the open ends thereof locking the inner and outer flanges together against axial displacement.

2. The method of claim 1 wherein the flanges are formed in such a manner that the open ends thereof lie in substantially the same plane.

3. The method of claim 1 including the step of forming a starting hole in all the pieces to be joined that is smaller than and located concentric with the internal diameters of the flanges.

4. The method of claim 2 wherein the size of the starting hole is made in the range of ⅓ to ⅔ of the internal diameter of the flanges, the size of the starting hole being dependent on the thickness of the materials to be joined, the thicker materials having proportionately larger starting holes.

5. The method of claim 1 including the step of providing compressive stresses in the material that is drawn into the flanges of the hole, the compressive stresses being approximately equal to the yield strength of the material.

6. The method of claim 1 wherein the faying surfaces of the completed flanges of the hole are provided with an hourglass shape, said shape locking the inner and outer flanges together against axial displacement.

7. The method of claim 6 wherein the hourglass shape is achieved by non-uniform thinning of the innermost flange.

8. The method of claim 6 wherein the flanges are formed with a draw punch including the step of decreasing the radii of curvature of the draw punch as the radii approach tangency with the face of the punch and increasing said radii as they approach tangency with the outer diameter of the draw punch in order to effect the hourglass shape.

9. The method of claim 1 wherein the faying surfaces are provided with a high coefficient of friction to prevent sliding of the surfaces relative to each other during the step of forming the flanged holes.

10. The method of claim 9 wherein the high coefficient of friction is provided by thorough cleaning of the surfaces before they are placed in contact with each other to utilize the typically high coefficient of friction resulting from contact of two clean dry metal surfaces.

11. The method of claim 10 wherein the thorough cleaning is achieved by solvent degreasing or washing in nonsolvent cleaners.

12. The method of claim 1 wherein the faying surfaces while being pressed together with a stress approximately equal to their yield strength are extruded and stretched in a manner that produces a microscopic, mechanical, granular engagement of the faying surfaces.

13. The method of claim 1 including the step of choosing pieces to be joined that are of identical thickness, yield strength and modulus of elasticity, in which case any orientation of the pieces will produce joints that have equal properties.

14. The method of claim 1 including the steps of choosing pieces that are identical as to yield strength and modulus of elasticity but of unequal thickness, and locating the thicker of the pieces in a manner that the thicker piece will form the inner flange of the flanged hole to achieve maximum joint strength.

15. The method of claim 1 including the steps of:
choosing pieces of material that have different yield strengths and moduli of elasticity, and
locating said pieces relative to each other in a manner that places the material having the lowest ratio of yield strength to modulus of elasticity closest to the internal diameter of the flanged hole when the flanges are formed to achieve maximum joint strength.

* * * * *